US008164275B2

(12) United States Patent
Doudousakis et al.

(10) Patent No.: US 8,164,275 B2
(45) Date of Patent: Apr. 24, 2012

(54) DRIVE CIRCUIT FOR HIGH-BRIGHTNESS LIGHT EMITTING DIODES

(75) Inventors: Eleftherios Doudousakis, New Rochelle, NY (US); Ciro Lee Sirio, Huntington, NY (US)

(73) Assignee: TDK-Lambda Americas Inc., Hauppauge, NY (US)

( * ) Notice: Subject to any disclaimer, the term of this patent is extended or adjusted under 35 U.S.C. 154(b) by 316 days.

(21) Appl. No.: 12/638,218

(22) Filed: Dec. 15, 2009

(65) Prior Publication Data
US 2011/0140630 A1    Jun. 16, 2011

(51) Int. Cl.
H05B 37/02    (2006.01)
(52) U.S. Cl. ......... 315/291; 315/224; 315/307; 323/282
(58) Field of Classification Search .............. 315/200 R, 315/209 R, 224, 225, 246, 247, 291, 294, 315/299, 302, 307, 308, 312; 323/222, 223, 323/225, 268, 271, 282, 285; 363/50, 56.01, 363/80, 124
See application file for complete search history.

(56) References Cited

U.S. PATENT DOCUMENTS

| | | | |
|---|---|---|---|
| 4,663,570 | A | 5/1987 | Luchaco et al. |
| 5,430,635 | A | 7/1995 | Liu et al. |
| 5,804,950 | A * | 9/1998 | Hwang et al. ............... 323/222 |
| 6,369,525 | B1 | 4/2002 | Chang et al. |
| 6,965,205 | B2 | 11/2005 | Piepgras et al. |
| 7,084,582 | B2 | 8/2006 | Buonocunto |
| 7,202,640 | B2 * | 4/2007 | Morita ..................... 323/205 |

(Continued)

FOREIGN PATENT DOCUMENTS
WO    WO-2005/089293    9/2005
(Continued)

OTHER PUBLICATIONS

K. Zhou, J.G. Zhang, S. Yuvarajan, D. Weng; 'Quasi-Active Power Factor Correction Circuit for HB LED Driver'; pp. 1410-1415, vol. 23, Issue 3, IEEE Transactions on Power Electronics, © 2007 IEEE (Institute of Electrical and Electronics Engineers), 1-4244-0714-1/07 (Abstract Only).

(Continued)

*Primary Examiner* — Jacob Y Choi
*Assistant Examiner* — Jimmy Vu
(74) *Attorney, Agent, or Firm* — McDermott Will & Emery LLP

(57) ABSTRACT

A drive circuit includes a DC/DC converter, an outer control loop providing an output voltage representing a comparison between a load current and a reference voltage, a multiplier multiplying the outer control loop output voltage with a sample of the rectified output and provide an output current, a current amplifier comparing an input line current sample and the multiplier output current, a comparator driving the switch with a modulated output based on the current amplifier output and a sawtooth reference, and an upper voltage limit loop having an output in electrical communication with the outer control loop output, wherein the outer control loop output voltage is impacted by the upper voltage limit loop output during a zero load scenario. The drive circuit also includes a line voltage transformer and a lightning suppression circuit coupled to the voltage rectifier output.

20 Claims, 1 Drawing Sheet

U.S. PATENT DOCUMENTS

| | | | |
|---|---|---|---|
| 7,256,569 B2 * | 8/2007 | Wu et al. | 323/222 |
| 7,262,559 B2 | 8/2007 | Tripathi et al. | |
| 7,321,203 B2 | 1/2008 | Marosek | |
| 7,378,805 B2 | 5/2008 | Oh et al. | |
| 7,486,033 B2 | 2/2009 | Chen et al. | |
| 7,511,437 B2 | 3/2009 | Lys et al. | |
| 7,538,525 B2 * | 5/2009 | Kim et al. | 323/205 |
| 2006/0113975 A1 | 6/2006 | Mednik et al. | |
| 2007/0024213 A1 | 2/2007 | Shteynberg et al. | |
| 2007/0040516 A1 | 2/2007 | Chen | |
| 2007/0159421 A1 | 7/2007 | Peker et al. | |
| 2007/0236159 A1 | 10/2007 | Beland | |
| 2008/0018261 A1 | 1/2008 | Kastner | |
| 2008/0122364 A1 | 5/2008 | McClellan | |
| 2008/0211420 A1 | 9/2008 | Walker et al. | |

FOREIGN PATENT DOCUMENTS

| | | |
|---|---|---|
| WO | WO-2007/094810 | 8/2007 |
| WO | WO-2008/066834 | 6/2008 |

OTHER PUBLICATIONS

Pan TianFu, Chiu HuangJen, Cheng ShihJen, Chyng ShihYen; National Taiwan Univ. of Science & Technology; 'An Improved Single-Stage Flyback PFC Converter for High-Luminance Lighting LED Lamps'; paper presented at 'ICEMI 2007', the 8th International Conference on Electronic Measurement & Instruments; pp. 212-215; published in 2007 by IEEE (Institute of Electrical and Electronics Engineers) (Abstract Only).

Arturas Zukauskas et al. (Vilnius Univ., Lithuania), Michael S. Shur (Rensselaeer Polytechnic), Remis Gaska (Sensor Electronic Technology, Inc.); 'Quadrichromatic White Solid State Lamp with Digital Feedback', Proc. SPIE (Proceedings of the International Society for Optical Engineering), vol. 5187, 185 (2004); DOI: 10.1117/12.514079 (Abstract Only).

* cited by examiner

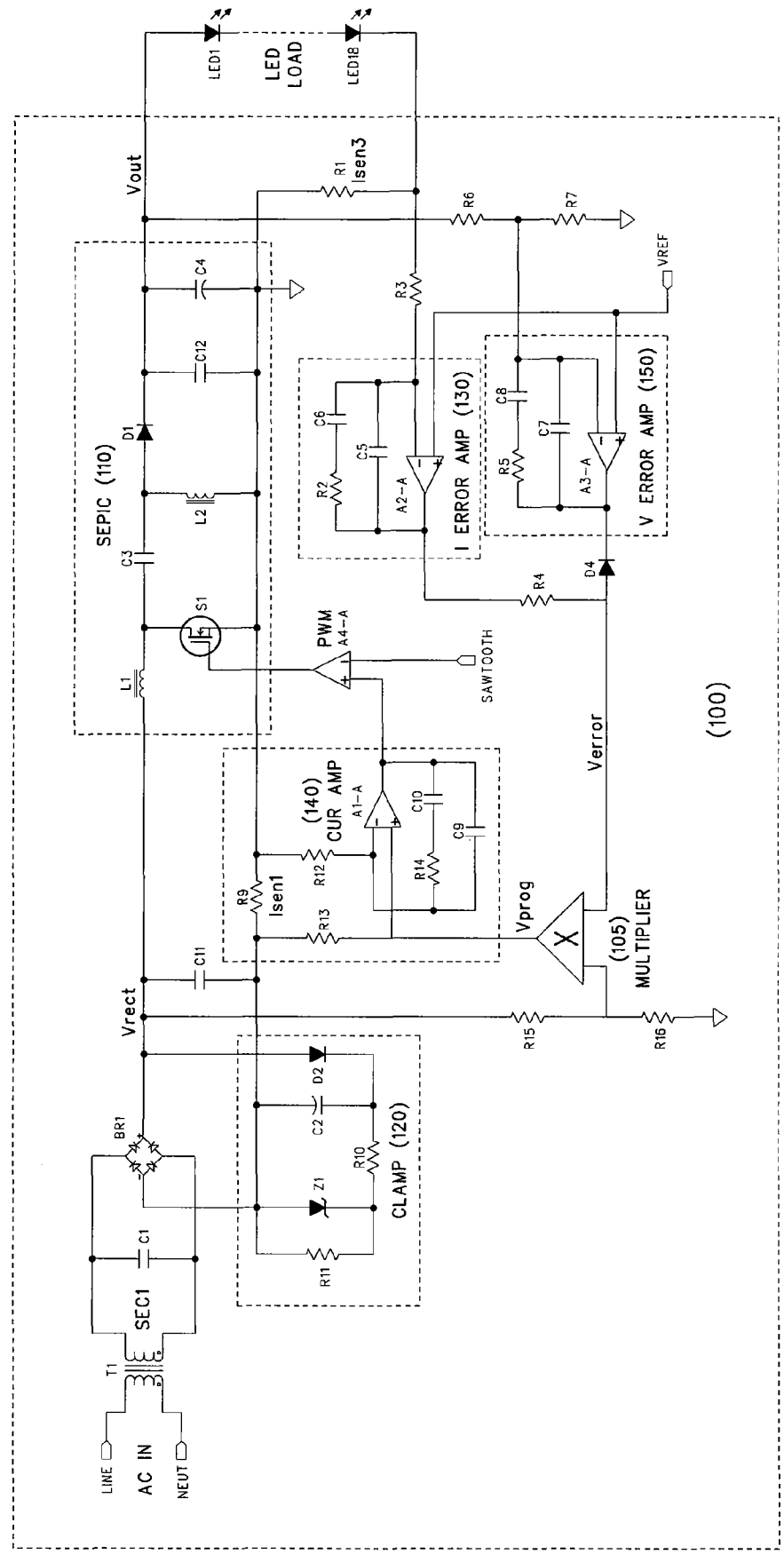

DRIVE CIRCUIT FOR HIGH-BRIGHTNESS LIGHT EMITTING DIODES

FIELD

The present invention relates to a drive circuit for powering high-brightness light emitting diodes ("HBLED"), and in particular to a drive circuit that utilizes a line frequency transformer, a novel voltage clamp and a single stage converter incorporating power factor correction.

BACKGROUND

HBLEDs have become an attractive alternative to light bulbs (incandescent and other technologies) due to their significantly higher efficiency and longer service life. Unlike light bulbs however, HBLEDs cannot be driven directly from the AC power line. An AC to DC Power Supply is required in order to provide isolation, step-down and rectification functions, among others. This power supply must incorporate power factor correction (PFC), high surge immunity and long service life to make LED lighting viable on a large scale. Power factor corrected power supplies in the prior art typically rely upon metal oxide varistors (MOV) or gas discharge tubes for surge suppression. The level of protection these devices provide unfortunately deteriorates with each successive surge event, yielding over time a virtually unprotected system. Street light applications, among others, specifically require long term robustness against repeated occurrences such as lightning strikes, line surges, etc. What is missing from the art is a driver circuit addressing all these and other needs.

SUMMARY

An embodiment of the present invention provides a driver circuit. The driver circuit includes a DC/DC converter including a switch, an input terminal, and an output terminal, wherein the input terminal is coupled to an output of a voltage rectifier and the output terminal is coupled to a load. The driver circuit includes an outer control loop having an input coupled to the load, wherein an output voltage of the outer control loop represents a comparison between a load current and a reference voltage, a multiplier configured to multiply the outer control loop output voltage with a sample of the voltage rectifier output and provide an output current, a current amplifier configured to provide an output representative of a comparison between an input line current sample and the multiplier output current, a comparator configured to provide a modulated output based on the current amplifier output and a sawtooth reference signal, wherein the modulated output drives the switch, and an upper voltage limit loop having an output in electrical communication with the outer control loop output, wherein the outer control loop output voltage is impacted by the upper voltage limit loop output during a zero load scenario. The driver circuit also includes a line voltage transformer and a lightning suppression circuit coupled to the voltage rectifier output.

BRIEF DESCRIPTION OF THE DRAWING FIGURES

FIG. 1 is a schematic diagram of a circuit in accordance with an embodiment of the present invention.

DETAILED DESCRIPTION

By way of overview and introduction, provided is a driver circuit for powering HBLEDs, where the driver circuit consists of a single stage power factor corrected converter fed by a line frequency isolation step down transformer and voltage clamp, the combination of which provides substantial repeatable surge immunity and long service life. The driver circuit normally operates in a constant output current mode with a preset upper voltage limit in the event of no-load operation.

FIG. 1 is a schematic diagram of driver circuit 100 embodying the present invention. Transformer T1 has a secondary winding SEC1, followed by a rectifier bridge BR1 and a single stage single-ended primary inductor converter ("SEPIC") 110. The SEPIC converter is described here for illustration purposes, other types of DC/DC converters could also be utilized in conjunction with the line frequency transformer/voltage clamp combination in achieving similar protection robustness. The SEPIC 110 is a type of switched mode power supply which exchanges energy between the capacitor C3 and the inductors L1, L2 to change the level of the rectified voltage Vrect to the level of the output voltage Vout. The amount of energy exchanged is controlled by the switch S1.

The line frequency transformer T1 provides a significant amount of surge protection due to its construction. This is primarily due to the fact that line frequency transformers perform poorly at higher frequencies, thereby reducing the amount of surge energy transmitted so that it can be more easily suppressed by the clamp circuit downstream. Unlike high frequency transformers typically used in the prior art, the windings on a line frequency transformer can be physically separated yielding a much stronger isolation barrier. Diode D2 provides a path to the lightning suppression block 120 consisting of a capacitor C2, a zener diode Z1, and resistors R10, R11. The lightning suppression block acts as a voltage clamp against high energy lightning strikes. Capacitor C2 shunts the energy from surge transients passing through transformer T1. During steady-state operation, capacitor C2 charges to the peak rectified voltage present at the cathode of diode D2. Resistors R10 and R11 act as only a small bleed path during normal operation. In the event of a transient that causes the voltage across C2 to rise beyond the rectified line voltage, zener diode Z1 conducts through R10, effectively discharging C2 back down to its normal voltage level. Unlike metal oxide varistor suppressors or gas tubes, the operation of the lightning suppression circuit 120 does not deteriorate over repetitive surge strikes. The resistor R11 is a high value resistor to minimize power losses and degradation of power factor. This combination of line frequency transformer and voltage clamp allows for very high immunity (10 KV) against repetitive surge events, thus, protecting the down stream converter, its control circuits, and LEDs.

To extend the life of the driver circuit, the use of electrolytic capacitors is minimized. There are two electrolytic capacitors: capacitor C2 for absorbing lightning strike transients, and capacitor C4 across the output of the driver circuit 100. Driver circuit 100 embodying the present invention makes accommodations for the natural degradation of capacitor C4. Capacitor C2 sees very little ripple current during normal operation, giving it a very long life time.

Electrolytic capacitors gradually lose capacitance as they age. The loss rate depends primarily on ripple current and operating temperature. An outer control loop 130 is designed to tolerate a much lower output capacitance while maintaining stable operation so as to accommodate the gradual loss of capacitance expected in capacitor C4, thereby significantly extending the system's useful lifetime. As the output capacitance decreases over time, the amount of 120 Hz sinusoidal ripple superimposed on the DC output current will increase.

Although this will cause some flickering of the LEDs at 120 Hz, this frequency is significantly higher than the human eye can detect.

The driver circuit 100 embodying the present invention contains the power train SEPIC 110 and its associated feedback control loops 130, 140, 150. Power factor compensation performance is achieved by modulating the input current to match the shape of the input voltage, while supplying a constant current to the load. The PFC is done by multiplier 105 which receives a sample of the input voltage waveform scaled down by a voltage divider formed from resistor R15 and resistor R16. The multiplier 105 multiplies this waveform by the output voltage $V_{error}$ of an error amplifier A2 in the outer control loop 130. The multiplier's output acts as a current source, which builds a voltage $V_{prog}$ across resistor R13. An inner feedback loop 140 contains a fast current error amplifier A1 which senses the input line current $I_{sen1}$ and compares it against voltage $V_{prog}$. The reference signal voltage $V_{prog}$ represents the desired shape of the input current in order to match the shape of the input voltage for close to unity power factor. The shape of voltage $V_{prog}$ is a rectified sine wave whose amplitude changes inversely proportionally to the output load current. Comparator A4 receives the output of current amplifier A1, compares it against a reference sawtooth waveform, and produces a pulse width modulated signal that drives FET switch S1.

The outer feedback loop 130 includes an error amplifier A2 which compares a fixed reference voltage $V_{ref}$ against the actual load current $I_{sen3}$. The output load current is low pass filtered utilizing a very low corner frequency, allowing for the aforementioned loss of output capacitance. In one embodiment, the PFC function can be implemented using, for example, conventional technology, such as the STMicroelectronics L4981 power factor corrector IC.

A voltage feedback loop 150 is utilized to provide an upper voltage limit in case of a zero load scenario. This feedback loop includes amplifier A3 which has at its non-inverting input the same reference voltage as the non-inverting input to amplifier A2. The inverting input to amplifier A3 has a sample of the output voltage taken from a voltage divider formed by resistor R6 and resistor R7. During a zero load scenario, the output voltage $V_{out}$ of the SEPIC 110 will rise. Once the voltage across R7 exceeds $V_{ref}$ the output of amplifier A3 changes to the low state. Subsequently, amplifier A3 will lower voltage $V_{error}$ at the input of multiplier 105 through diode D4, which in turn will lower reference signal voltage $V_{prog}$, limiting the output voltage. However, the invention is not so limited. As would be known by persons of skill in the art, an upper voltage limit can be obtained by inverting the outputs of the control loops. Importantly, the upper voltage limit impacts the output of amplifier A3 in a manner so that the SEPIC 110 output voltage is limited during a zero load scenario.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated.

We claim:

1. A drive circuit comprising:
   a DC/DC converter including a switch, an input terminal, and an output terminal, wherein the input terminal is coupled to an output of a voltage rectifier and the output terminal is coupled to a load;
   an outer control loop having an input coupled to the load, wherein an output voltage of the outer control loop represents a comparison between a load current and a reference voltage;
   a multiplier configured to multiply the outer control loop output voltage with a sample of the voltage rectifier output and provide an output current;
   a current amplifier configured to provide an output representative of a comparison between an input line current sample and the multiplier output current;
   a comparator configured to provide a modulated output based on the current amplifier output and a sawtooth reference signal, wherein the modulated output drives the switch; and
   an upper voltage limit loop having an output terminal in electrical communication with the outer control loop output, wherein the outer control loop output voltage is impacted by the upper voltage limit loop output during a zero load scenario.

2. The circuit of claim 1 further comprising a lightning suppression circuit coupled to the voltage rectifier output, wherein the lightning suppression circuit is configured as a voltage clamp.

3. The circuit of claim 2, wherein the lightning suppression circuit includes a series resistance, a shunt capacitor, and a zener diode connected in a configuration to discharge the capacitor if a transient voltage causes the capacitor to charge above the voltage rectifier output.

4. The circuit of claim 1, further comprising a line frequency transformer.

5. The circuit of claim 4, wherein the line frequency transformer includes windings that are physically separated.

6. The circuit of claim 1, wherein the input line current sample is taken at a point in electrical communication with the voltage rectifier output.

7. The circuit of claim 1, wherein the load is at least one high brightness light emitting diode.

8. The circuit of claim 1, wherein the DC/DC converter is a single ended primary inductor converter (SEPIC).

9. The circuit of claim 1, wherein the DC/DC converter includes an electrolytic output capacitor, and the outer control loop is configured to accommodate a loss of capacitance in the electrolytic output capacitor.

10. A drive circuit comprising:
   a DC/DC converter having an input terminal in electrical communication with a rectifier circuit output terminal, and an output terminal in electrical communication with a load;
   an outer control loop having an input terminal connected to a first sense circuit configured to sense a load current, and an outer control loop output terminal;
   a power factor correction circuit having a first input terminal coupled to the outer control loop output terminal, and second input terminal coupled to a sampling circuit configured to sample an output voltage of the rectifier circuit;
   an inner feedback loop having first input terminal coupled to an output terminal of the power factor correction circuit, a second input terminal coupled to a second sense circuit configured to sense a line current at the rectifier circuit output terminal, and an inner feedback loop output terminal;
   a modulator having a first input terminal in electrical communication with the inner feedback loop output terminal, and a modulator output terminal coupled to a control input of the DC/DC converter; and a voltage feedback loop in electrical communication with the first sense circuit and a voltage feedback loop output terminal in electrical communication with the outer control loop output terminal.

11. The circuit of claim 10, wherein the DC/DC converter includes a semiconductor switch, and the control input is connected to a control terminal of the semiconductor switch.

12. The circuit of claim 10, wherein the power factor correction circuit is configured to multiply the rectifier circuit output voltage sample by a voltage at the outer control loop output terminal.

13. The circuit of claim 10, further comprising a lightning suppression circuit coupled to the voltage rectifier output, wherein the lightning suppression circuit is configured as a voltage clamp.

14. The circuit of claim 13, wherein the lightning suppression circuit includes a series resistance, a shunt capacitor, and a zener diode connected in a configuration to discharge the capacitor if a transient voltage causes the capacitor to charge above the voltage rectifier output.

15. The circuit of claim 10, wherein the inner feed back loop includes a current error amplifier configured to compare an output signal of the power factor correction circuit with the line current at the rectifier circuit output terminal.

16. The circuit of claim 10, wherein the modulator includes a second input terminal, further comprising:

a saw tooth waveform generator in electrical communication with the modulator second terminal;

wherein, the modulator is configured to produce a pulse width modulated signal.

17. The circuit of claim 10, further comprising a line frequency transformer having windings that are physically separated.

18. The circuit of claim 10, wherein the DC/DC converter is a single ended primary inductor converter (SEPIC).

19. The circuit of claim 10, wherein the DC/DC converter includes an electrolytic output capacitor, and the outer control loop is configured to accommodate a loss of capacitance in the electrolytic output capacitor.

20. The circuit of claim 10, wherein an output of the upper voltage limit loop impacts a signal at the outer control loop output terminal during a zero load scenario.

* * * * *